United States Patent [19]
Witt

[11] 3,947,433
[45] Mar. 30, 1976

[54] SUPPORTED CHROMIUM OXIDE CATALYST HAVING MIXED ADJUVANT

[75] Inventor: Donald R. Witt, Bartlesville, Okla.

[73] Assignee: Phillips Petroleum Company, Bartlesville, Okla.

[22] Filed: May 13, 1974

[21] Appl. No.: 469,523

[52] U.S. Cl............ 260/88.2 R; 252/430; 260/93.7; 260/94.9 C; 260/94.9 D
[51] Int. Cl.$^2$...................... C08F 4/24; C08F 10/00
[58] Field of Search..... 260/88.2 R, 94.9 D, 94.9 C; 252/430

[56] References Cited
UNITED STATES PATENTS

| | | | |
|---|---|---|---|
| 3,476,724 | 11/1969 | Hogan et al. | 260/94.9 D |
| 3,484,428 | 12/1969 | Kallenbach | 260/94.9 D |
| 3,485,771 | 12/1969 | Horvath | 260/94.9 D |
| 3,622,521 | 11/1971 | Hogan et al. | 260/94.9 D |
| 3,625,864 | 12/1971 | Horvath | 260/94.9 D |
| 3,642,749 | 2/1972 | Johnson et al. | 260/94.9 D |
| 3,658,777 | 4/1972 | Green | 260/94.9 D |
| 3,704,287 | 11/1972 | Johnson et al. | 260/88.2 R |
| 3,759,918 | 9/1973 | Yamaguchi et al. | 260/88.2 R |
| 3,767,635 | 10/1973 | Yamaguchi et al. | 260/88.2 R |
| 3,780,011 | 12/1973 | Pullukal | 260/94.9 D |
| 3,798,202 | 3/1974 | Nasser, Jr. | 260/94.9 D |
| 3,862,104 | 1/1975 | Wilt | 260/94.9 D |
| 3,878,179 | 4/1975 | Hogan | 260/88.2 R |

*Primary Examiner*—Alan Holler

[57] ABSTRACT

Olefin polymers are made using a supported chromium oxide catalyst which is treated with a mixture of an organoboron compound and a hydrocarbyl aluminum hydrocarbyl oxide. This catalyst is capable of producing high shear response polymer and is of particular utility in the production of such polymer in a particle-form process.

18 Claims, No Drawings

SUPPORTED CHROMIUM OXIDE CATALYST HAVING MIXED ADJUVANT

BACKGROUND OF THE INVENTION

This invention relates to modified supported chromium oxide olefin polymerization catalysts.

Supported chromium oxide catalysts can be used to prepare molding grade olefin polymers in a hydrocarbon solution to give a product having excellent characteristics from many standpoints. Such polymer generally has inherently high shear response, for instance. Supported chromium oxide catalysts can also be used to prepare molding grade olefin polymers in a slurry system wherein the polymer is produced in the form of small particles of solid material suspended in the diluent. This process, frequently referred to as a particle-form process, has the advantage of being less complex, but does not produce polymers which are exactly comparable to solution polymers in all rheological properties. There are certain applications where it is necessary to have properties such as high shear response associated with polymers made in a particle-form process.

BRIEF SUMMARY OF THE INVENTION

It is an object of this invention to provide a method for producing high shear response polymer in a particle-form process; it is a further object of this invention to provide polymer produced by a particle-form process which has characteristics associated with solution polymerized polymers; and it is still yet a further object of this invention to provide improved olefin polymerization catalysts.

In accordance with this invention, a supported chromium oxide catalyst is treated with an organoboron compound and a hydrocarbyl aluminum hydrocarbyl oxide.

DESCRIPTION OF THE PREFERRED EMBODIMENTS

The invention is primarily concerned with the preparation of polymers in a particle-form process. The polymers which are produced with the catalyst made in accordance with this invention are polymers of at least one polymerizable olefin, preferably normally solid homopolymers of ethylene or copolymers of ethylene with another 1-olefin containing 3–8 carbon atoms per molecule. As an example, the olefin polymer can be produced from at least one aliphatic mono-1-olefin having 2–8 carbon atoms per molecule. Exemplary copolymers include those of ethylene/propylene, ethylene/1-butene, ethylene/1-hexene, ethylene/1-octene and the like. The major portion of said copolymers is derived from ethylene and generally consists of about 95–99 mole percent of ethylene. These polymers are well suited for extrusion, blow molding, injection molding, and the like.

Suitable supports for the chromium oxide include silica, silica-alumina, silica-titania, and the like. The supports are particulate in nature and they can be prepared by precipitation and coprecipitation techniques or by mixing silica with other refractory materials. For example, sodium silicate can be added to an acid such as sulfuric acid (or an acid salt), the resulting precipitate aged for at least one hour, the water-soluble salts removed, and then the water removed by azeotropic distillation with a material such as ethyl acetate. The mixing of the silicate into the acid (or vice versa) is preferably done slowly and with vigorous stirring so that, for instance, 0.5 to 15, preferably 1 to 5 percent of the silicate is added per minute. Silica constitutes a major portion of the support with the other metal compound or compounds when used making up from 0.1 to about 20 weight percent of the finished catalyst. This support can also be impregnated with a promoter metal compound such as a titanium compound prior to activation. Alternatively, it can be coprecipitated with a titanium compound. The support is admixed with 0.1 to about 10 weight percent chromium compound prior to activation.

The chromium compound can be a water-soluble compound such as chromium nitrate, chromium acetate, chromium trioxide, and the like, or an organic chromium compound such as tert-butyl chromate, chromium acetylacetonate, and the like. The organochromium compound can be dissolved in a non-aqueous solvent such as pentane, hexane, benzene, and the like, and the solution is added to the support which is preferably substantially dry. The resulting mixture is dried and activated in dry air at an elevated temperature generally within the range of 500° to 2,000°F, preferably 750° to 1,400°F for about one-half hour to 50 hours, more preferably 2 to 10 hours. At least the substantial portion of the chromium in low valence states is converted to the hexavalent form.

After activation, the catalyst is cooled and treated with an organoboron compound and a hydrocarbyl aluminum hydrocarbyloxide.

The organoboron compound used in combination with the hydrocarbyl aluminum hydrocarbyloxide can be generically expressed as $BR_3$ wherein the R is individually selected from the group consisting of hydrogen, alkyl, cycloalkyl and aryl and combinations of these such as alkaryl, aralkyl, alkylcycloalkyl, etc., at least one R in each compound being a hydrocarbon radical in which the number of carbon atoms can range from 1 to 12, the total number of carbon atoms in each compound, however, not exceeding 30. Exemplary compounds include trimethylboron, triethylboron, triisobutylboron, tri-n-octylboron, tricyclohexylboron, trimethylcyclopentylboron, triphenylboron, tribenzylboron, tritolylborons, tri(2-ethylphenyl) boron, and the like. Also suitable are mixed alkylborons such as methyldiethylboron, diethylisopropylboron, n-propyldi-n-hexylboron, and the like. The term organoboron is also meant to encompass boron compounds such as diborane which form an organoboron compound in situ on contact with olefin monomer. The trialkylborons are generally used, however, because of their availability and ease of handling. The amount of boron compound used is in the range of 0.5 to 10 weight percent based on the weight of the supported chromium oxide catalyst, preferably about 0.5 to 5 weight percent (0.005–0.05 moles) based on the weight of 100 grams of the supported chromium oxide catalyst.

The hydrocarbyl aluminum hydrocarbyloxides used in conjunction with the organoboron compound are those represented by the formula $$AlR_a(OR')_b$$

wherein R and R' are the same or different and are alkyl, aryl, or cycloalkyl radicals or combinations thereof such as alkaryl, aralkyl, cycloalkyl, etc., each radical containing from 1 to about 10 carbon atoms, preferably 1 to 6, and wherein $a$ and $b$ are integers of 1 or 2, and $a + b = 3$. The hydrocarbyl aluminum hydrocarbyloxide is used in the range of 0.5 to 10 weight percent based on the weight of the supported chromium oxide catalyst. Exemplary compounds include diphenylaluminum phenoxide, p-tolylaluminum dibutoxide, di-n-propylaluminum methylcyclohexoxide, isobutylaluminum diisobutoxide, dimethylaluminum methoxide, diethylaluminum ethoxide, diethylaluminum n-propoxide, diethylaluminum t-butoxide, diisobutylaluminum isobutoxide, di-n-propylaluminum n-propoxide, di-2-methylpentylaluminum ethoxide, dimethylaluminum decanoxide, diethylaluminum phenoxide, dibenzylaluminum ethoxide and the like. Presently preferred are the dialkylaluminum alkoxides. The hydrocarbyl aluminum hydrocarbyloxides can be prepared by reacting a hydrocarbon solution of a trihydrocarbyl aluminum with a hydrocarbon solution of an alcohol at about a 1:1 to 1:2 molar ratio. After the reaction is completed, the required amount of solution is used to treat the catalyst. The solvent is preferably the same as that used as the diluent in the polymerization, i.e., isobutane, pentane, or the like, but can also be different.

The aluminum hydrocarbyloxide and organoboron compounds are preferably contacted with the catalyst prior to introduction of the monomer. They can be added to the polymerization reactor, in the case of a batch reactor, prior to addition of the monomer and raising of the temperature to polymerization conditions. Alternatively they can be premixed with the chromium oxide catalyst but in such a case it is preferred to contact the treated catalyst with the monomer or mixture of monomers within several minutes since otherwise the activity of the catalyst appears to decrease.

In either event, it is preferred that the hydrocarbyloxide solution be added slowly to a slurry of the catalyst with vigorous mixing by stirring, for instance, since it reacts quickly with the catalyst and thus if the hydrocarbyloxide is simply poured over the catalyst or into a slurry of catalyst in a diluent, the first portion of the catalyst to be contacted with incorporate a large percentage of the hydrocarbyloxide and the rest will get less or none. The mixing should continue for a short time after the last of the hydrocarbyloxide is added. The organoboron compound can be added by a separate stream to the catalyst at the same time, or the organoboron and hydrocarbyloxide streams can be combined just prior to addition to the catalyst. It is also possible to first add all of one component and thereafter add all of the other (with vigorous mixing in both cases) although it is preferred to add the two together either in separate streams into a vessel containing a slurry of the catalyst or by combining separate streams in a mixing T and introducing a combined stream into the vessel. The catalyst is preferably added in a separate stream to insure better mixing than would be obtained if initial contact between the catalyst and adjuvants were in a mixing T.

Good results have been obtained when the organoboron to aluminum hydrocarbyloxide mole ratio is within the range of about 0.5:1 to about 2:1.

The temperature during the initial contact with the hydrocarbyloxide and organoboron compound with the catalyst can vary from 0° to 130°F. and is preferably about 0° to 90°F.

The particle-form process in which the catalyst of this invention is of particular applicability is a process in which at least one olefin is polymerized at a temperature in the range of about 150° to 230°F. The catalyst is maintained in suspension and is contacted with the olefin or mixture of olefins in an organic medium at pressures sufficient to maintain the medium and at least a portion of the olefins in the liquid phase. The medium and temperatures are such that the polymer produced is insoluble in the medium and is recovered in the form of solid particles. The organic medium (diluent) is generally a paraffin and/or cycloparaffin having from 3 to 12 carbon atoms per molecule. Representative examples include propane, butane, isobutane, pentane, isopentane, cyclohexane, n-dodecane, methylcyclohexane, and the like. Pressures can range from about 100 to 700 psig or higher, and catalyst concentrations can range from about 0.001 to about 1 weight percent based on the weight of the reactor contents. Hydrogen can be used to modify the molecular weight of the polymers produced in the process if desired. The process for preparing the polymers in particle-form is broadly disclosed in British Pat. No. 853,414, complete specification published Nov. 9, 1960, and later variations are disclosed in Norwood et al., U.S. Pat. No. 3,644,323 issued Feb. 22, 1972, the disclosures of which are hereby incorporated by reference. The catalyst of the invention could also be used in solution polymerizations or gas phase polymerizations, but he unexpected advantage afforded by the catalyst of the invention relates primarily to particle-form polymerizations.

The contacting of monomer or monomers with catalyst can be effected by any of the techniques known in the art for solid catalysts. A convenient method is to suspend the chromium oxide catalyst in the liquid diluent and to agitate the reaction mixture, thus maintaining the catalyst as a solid suspension in the liquid diluent. Other known catalytic contacting methods such as fixed bed, fluidized bed, gravitating bed, etc., can also be used.

Polymers produced with the catalyst of the instant invention are readily processed in conventional plastics fabrication equipment. One measure of the processability is the melt index of the polymers, those having high melt indices being more easily handled than those having low melt indices. The melt indices of the polymers produced in the instant invention can range from about 0.05 to about 20 or even higher.

Broad molecular weight distribution polymers are produced with the catalyst of this invention. One indication of breadth of molecular weight distribution is given by the ratio between high load melt index (HLMI) determined according to ASTM D1238-57T, Cond. F, and melt index (MI) determined according to ASTM D1238-57T, Cond. E. Similarly, the ratio between a "CIL" flow rate and a melt index can be determined by measuring the "CIL" flow rate in a plastometer manufactured by Canadian Industries Ltd. (CIL). In this method, the flow rate of the polymer is determined at 1500 psig gas pressure through a capillary tube 0.176 inches long and 0.01925 inches inner diameter at 190°C. Polymers with broad molecular weight distributions are more shear sensitive and therefore exhibit higher HLMI/MI or CIL/MI ratios than polymers with narrow molecular weight distributions. Broad molecular weight distribution polymers, particularly those having a melt index of about 0.1 to 1, preferably 0.1 to 0.3 are quite useful in blow molding containers and the like since they exhibit good melt flow properties and the molded articles have good resistance to environmental stress cracking. The polymers made using the catalyst of this invention have higher shear response compared with polymers made with catalyst utilizing no adjuvant or catalysts utilizing only one of the adjuvants. Because of their improved shear response due to broader molecular weight distribution, the polymers produced with the catalyst of this invention having a melt index up to 20 or higher are particularly suitable candidates for injection molding and rotational molding applications.

EXAMPLE I

A series of runs was made in a 2 liter stirred reactor with isobutane as the diluent and a commercial polymerization catalyst comprising microspheroidal silica impregnated with nominally 2 weight percent chromium oxide. The catalysts were activated by calcination in dry air at the temperatures indicated in the Table. Hydrocarbon solutions of the organometal compound or compounds used were passed to the reaction zone separately as required to give the weight percent based on catalyst weight shown in the Table. Unless otherwise indicated all runs were conducted at a reactor temperature of 220°F, a reactor pressure of 500 psig and a run length of 120 minutes. Copolymers of ethylene and 1-hexene were made in all instances. The data are presented in the Table. Molar concentration of adjuvants is based on 100 grams of catalyst.

Catalyst and diluent were charged to the reactor at about 80°F and each organic compound in hydrocarbon solution added separately to the stirred catalyst/diluent slurry at about 80°F and mixed for several minutes. The reactor and its contents were then brought up to the reaction temperature and the monomers charged.

weight distribution of polymer made with the supported chromium oxide catalyst. When both adjuvants are used simultaneously (runs 4, 6, 7, 9, 10, 12) the results unexpectedly show HLMI/MI values ranging from 147 to 218, more generally in the area of about 170 to about 205. The data suggest the increased effect of using both adjuvants together diminishes when the supported chromium oxide catalyst is activated at higher temperatures as a comparison between runs 9 (1,100°F activation temperature, HLMI/MI value of 174) and 12 (1,200°F activation temperature, HLMI/MI value of 147) demonstrates. The results of runs 6, 7 (900°F activation temperature, HLMI/MI values of 206 and 205, respectively) further support the conclusion that the unexpected broadening of the molecular weight distribution of polymer made over the supported chromium oxide in the presence of both adjuvants is enhanced when the oxide catalyst is activated at lower temperatures. In runs 6, 7, 9 and 12 the concentrations of catalyst adjuvants were the same in each instance. In terms of moles, 2 weight percent TEB based on the weight of the supported chromium oxide catalyst is equivalent to a value of 0.020 and 3.5 weight percent DEALE is equivalent to 0.027. Total moles of catalyst adjuvant thus is 0.047. In these runs the molar ratio of TEB to DEALE is about 0.8 to 1. In run 2 wherein 4.6 weight percent TEB based on the weight of the supported chromium oxide is used, the equivalent value in terms of moles is 0.047. In run 3 wherein 6.1 weight percent DEALE based on the weight of the supported chromium oxide is used, the equivalent value in terms of moles is 0.047. Thus the total molar concentration of catalyst adjuvants in runs 2 and 3 is equivalent to the total molar concentrations of catalyst adjuvants in runs 6, 7, 9 and 12 and the unexpected increase in the HLMI/MI ratios observed is significantly greater than the expected additive effect.

Table I

| Run No. | Catalyst Activation Temp °F | Weight %[a] 1-hexene | Weight % Metal Compound TEB[b] | DEALE[c] | Polymer[d] Yield g/g | Melt Index | HLMI MI | Polymer Density g/cc |
|---|---|---|---|---|---|---|---|---|
| 1 | 900 | 8.24 | 2 | 0 | 3045 | 0.083 | 140 | 0.9460 |
| 2 | 900 | 8.86 | 4.6[e] | 0 | 3635 | 0.087 | 124 | 0.9470 |
| 3 | 900 | 8.36 | 0 | 6.1[e] | 3640 | 1.37 | 120 | 0.9587 |
| 4 | 900 | 8.38 | 4 | 3.5 | 2515 | 0.10 | 172 | 0.9522 |
| 5[f] | 900 | 5.2 | 0 | 3.5 | 5000 | 0.14 | 133 | 0.9472 |
| 6 | 900 | 5.65 | 2 | 3.5 | 4380 | 0.12 | 206 | 0.9478 |
| 7[g] | 900 | 6.64 | 2 | 3.5 | 3460 | 0.19 | 205 | 0.9496 |
| 8 | 1100 | 6.25 | 0 | 3.5 | 4340 | 0.29 | 113 | 0.9466 |
| 9 | 1100 | 6.76 | 2 | 3.5 | 3410 | 0.095 | 174 | 0.9476 |
| 10 | 1100 | 6.34 | 1 | 3.5 | 3250 | 0.067 | 218 | 0.9386 |
| 11[h] | 1200 | 5.42 | 0 | 3.5 | 5260 | 0.307 | 109 | 0.9460 |
| 12 | 1200 | 6.02 | 2 | 3.5 | 4240 | 0.111 | 147 | 0.9460 |
| 13 | 1320 | 2.0 | 0 | 0 | ~5000 | 0.50 | 80 | 0.950 |

[a]Weight percent based on total monomer stream.
[b]Triethylboron.
[c]Diethylaluminum ethoxide.
[d]Yield in terms of grams polymer per gram of catalyst.
[e]Equivalent on a mole basis to 2 weight percent TEB + 3.5 weight percent DEALE.
[f]Run length was 113 minutes.
[g]Reactor pressure was 450 psig.
[h]Run length was 114 minutes.

Inspection of the data in the Table shows that polymer made in the absence of either of the organometal catalyst adjuvants has a HLMI/MI ratio of 80 (control run 13). However, when either TEB or DEALE is used as catalyst adjuvant (runs 1, 2 and 3, 5, 8, 11 respectively) the HLMI/MI ratio is increased with values ranging from 109 to 140. It is apparent that either adjuvant has the capability to broaden the molecular

EXAMPLE II

Another series of runs was made in a manner essentially identical to that of Example I except the catalyst was a silica cogelled with 2.5 weight percent titanium based on the total weight of the silica and titanium after drying. The thus formed hydrogel was impregnated with a chromium compound sufficient to give 2 weight percent chromium oxide based on the total weight of the catalyst after calcining. The water was then removed and the catalyst activated by calcination in dry air at the temperatures indicated in the Table. The 220°F reactor temperature, 500 psig reaction pressure, and other conditions were identical to those of Example I. The results were as follows:

TABLE II

| Run No. | Catalyst Activation Temp. | Wt. % Hexane | Wt. % Metal Compound | | Polymer Yield, g/g | Melt Index | HLMI MI | Polymer Density, g/cc |
|---|---|---|---|---|---|---|---|---|
| | | | TEB | DEALE | | | | |
| 14 | 900 | 8.0 | 6 | 3.5 | 4260 | 0.28 | 192 | .9496 |
| 15 | 900 | 9.4 | — | 3.5 | 2660 | 0.54 | 106 | .9530 |
| 16 | 900 | 9.48 | — | 3.5 | 3930 | 0.48 | 124 | .9488 |

This table shows that the same high HLMI/MI ratio is obtained when the catalyst is a silica cogelled with titanium.

While this invention has been described in detail for the purpose of illustration, it is not to be construed as limited thereby but is intended to cover all changes and modifications within the spirit and scope thereof.

I claim:

1. A process for producing a catalyst comprising: activating a supported chromium oxide at a temperature within the range of 500°–2,000°F; thereafter treating said thus-activated supported chromium oxide with from 0.5 to 10 weight percent, based on the weight of said supported chromium oxide, of a hydrocarbyl aluminum hydrocarbyloxide and from 0.5 to 10 weight percent, based on the weight of said supported chromium oxide of an organoboron compound.

2. A method according to claim 1 wherein said supported chromium oxide is treated at a temperature within the range of 0° to 130°F.

3. A method according to claim 1 wherein said hydrocarbyl aluminum hydrocarbyl oxide and said organoboron compound are in a hydrocarbon solvent and are added slowly to a slurry of said catalyst in a hydrocarbon diluent while subjecting said slurry to vigorous mixing.

4. A method according to claim 1 wherein said hydrocarbyl aluminum hydrocarbyloxide is a dialkylaluminum alkoxide and said organoboron compound is a trialkylboron.

5. A method according to claim 4 wherein said hydrocarbyl aluminum hydrocarbyl oxide is diethylaluminum ethoxide and said organoboron compound is triethylboron.

6. A method according to claim 1 wherein said chromium oxide is supported on a precipitated silica.

7. A method according to claim 6 wherein said chromium oxide is supported on silica coprecipitated with a titanium compound.

8. A method according to claim 1 wherein a mole ratio of said organoboron to said hydrocarbyl aluminum hydrocarbyloxide is within the range of 0.5:1 to 2:1.

9. A method according to claim 8 wherein said catalyst is treated at a temperature within the range of 0° to 90°F, said hydrocarbyloxide is in a hydrocarbon solvent and said organoboron compound is in a hydrocarbon solvent and said hydrocarbyloxide and organoboron compound are slowly added to a slurry of said catalyst in a hydrocarbon diluent while subjecting said slurry to vigorous mixing, and wherein said hydrocarbyloxide is diethylaluminum ethoxide and said organoboron compound is triethylboron, and wherein said chromium oxide is supported on silica coprecipitated with a titanium compound.

10. A catalyst prepared by the method of claim 1.

11. A process which comprises contacting, in a liquid diluent at a temperature such that at least a substantial part of the polymer produced is insoluble in said diluent, at least one polymerizable olefin under polymerization conditions with a catalyst which catalyst is produced by activating a supported chromium oxide at a temperature within the range of 500°–2,000°F, thereafter treating said thus-activated supported chromium oxide with from 0.05 to 10 weight percent based on the weight of said supported chromium oxide of a hydrocarbyl aluminum hydrocarbyloxide and from 0.5 to 10 weight percent based on the weight of said supported chromium oxide of an organoboron compound.

12. A method according to claim 11 wherein said olefin is at least one aliphatic mono-1-olefin having 2 to 8 carbon atoms per molecule.

13. A method according to claim 11 wherein said olefin is ethylene and another 1-olefin, and said polymer consists of 95 to 99 mole percent ethylene.

14. A method according to claim 11 wherein said contacting is carried out at a temperature within the range of 150°–230°F and substantially all of said polymer is in particle-form.

15. A method according to claim 11 wherein said diluent is a paraffin or cycloparaffin, or mixture thereof, having from 3 to 12 carbon atoms per molecule.

16. A method according to claim 11 wherein said diluent is isobutane.

17. A method according to claim 11 wherein said hydrocarbyl aluminum hydrocarbyloxide is diethylaluminum ethoxide and said organoboron compound is triethylboron.

18. A method according to claim 11 wherein said chromium oxide is supported on a silica coprecipitated with a titanium compound.

* * * * *